United States Patent
Raines et al.

(10) Patent No.: US 7,596,512 B1
(45) Date of Patent: Sep. 29, 2009

(54) SYSTEM AND METHOD FOR DETERMINING VEHICLE PRICE ADJUSTMENT VALUES

(75) Inventors: Richard T. Raines, Arlington, VA (US); Renan Ayrault, Washington, DC (US)

(73) Assignee: Carfax, Inc., Centreville, VA (US)

( * ) Notice: Subject to any disclaimer, the term of this patent is extended or adjusted under 35 U.S.C. 154(b) by 384 days.

(21) Appl. No.: 10/721,780

(22) Filed: Nov. 26, 2003

(51) Int. Cl.
*G06Q 30/00* (2006.01)
(52) U.S. Cl. .......................... 705/26; 705/37
(58) Field of Classification Search ........... 705/26, 705/37
See application file for complete search history.

(56) References Cited

U.S. PATENT DOCUMENTS

| | | | |
|---|---|---|---|
| 4,989,144 A | 1/1991 | Barnett et al. | |
| 5,127,005 A | 6/1992 | Oda et al. | |
| 5,598,511 A | 1/1997 | Petrinjak et al. | |
| 5,774,883 A * | 6/1998 | Andersen et al. | 705/38 |
| 5,899,985 A | 5/1999 | Tanaka | |
| 6,052,631 A | 4/2000 | Busch et al. | |
| 6,098,061 A | 8/2000 | Gotoh et al. | |
| 6,259,354 B1 | 7/2001 | Underwood et al. | |
| 6,397,131 B1 | 5/2002 | Busch et al. | |
| 6,505,106 B1 | 1/2003 | Lawrence et al. | |

2002/0194051 A1 12/2002 Hall et al.

OTHER PUBLICATIONS

Brown, Just How Used is That Used Car? The Washington Post, Aug. 18, 1997, 4 pages.*
Meredith Little, Buying and selling a car online. Mac@Home. Louisville: Sep. 1999.vol. 4, Iss. 9; p. 4, 7 pgs.*
Maynard, Playing Used-Car Detective, Online, New York Times, Jul. 29, 2001, p. 10, downloaded from ProQuest on the Internet on Sep. 13, 2008, 4 pages.*
Interview Materials, Mar. 9, 2009, 16 pages of materials presented during an in-person interview of Mar. 9, 2009.*

* cited by examiner

*Primary Examiner*—James Zurita
(74) *Attorney, Agent, or Firm*—Marc S. Kaufman; Nixon Peabody, LLP

(57) ABSTRACT

System and method for computing price adjustment values associated with vehicle history attributes including a vehicle history database with vehicle history datasets, a transaction database, a vehicle history knowledge determination module adapted to determine whether a sale transaction related to a transaction record occurred with buyer's knowledge of the vehicle history attributes associated with the vehicle of the transaction record and to classify each transaction record based on whether buyer possessed knowledge of the vehicle history attributes, and a price adjustment module adapted to determine price adjustment values for the vehicle history attributes based on the vehicle history datasets and classification of the plurality of transaction records. In accordance with one aspect, the present invention may be implemented as a computer readable medium with instructions.

38 Claims, 6 Drawing Sheets

| | | |
|---|---|---|
| Air Bag Deployed<br>Abandoned<br>Accident<br>Assembled<br>Auction Vehicle Offered<br>Auction Vehicle Sold<br>Child Lien Added<br>Child Lien Removed<br>Commercial Vehicle<br>Cert. Pre-Owned Vehicle<br>Curbstoning<br>Crash Test Vehicle<br>Damaged by Fire<br>Damage Disclosure<br>Dismantled Title<br>Emissions Inspection Failed<br>Emissions Inspect. Passed<br>First Owner<br>Fire Damaged | Flood Damaged<br>Fleet Vehicle<br>Grey Market<br>Gross Polluter<br>Government Vehicle<br>Hail Damaged<br>Junk Title<br>Lien 1 Reported<br>Lien 2 Reported<br>Lease Vehicle<br>Lemon Law Vehicle<br>New Owner<br>Not Actual Mileage Title<br>Non-Branded Buyback<br>Number of Owners<br>Non-legal High Way<br>Non Profit<br>Odometer Actual<br>Odometer Rollback<br>Odometer Rollover | Police Vehicle<br>Private Vehicle<br>Recall<br>Rebuilt Vehicle Title<br>Rental Vehicle<br>Reported Stolen<br>Reported Veh.Damage<br>Repossessed<br>Safety Insp. Failed<br>Safety Insp. Passed<br>Salvaged Title<br>Taxi Vehicle<br>Theft Recovery<br>Title Issued<br>Title/Regist. Issued<br>Total Loss<br>Vehicle Repaired<br>Vehicle Serviced |

Figure 3

| Ref. | Filter questions | Answer Yes | Answer No | No answer or don't know |
|---|---|---|---|---|
| A | Did a CARFAX consumer run a Report on this VIN? | Go to B | Go to G | X |
| B | Is there some buyer identification available with VIN? | Go to C | Go to D | X |
| C | Is vehicle buyer one of the consumers who ran the Report? | KC | Go to D | X |
| D | Did consumer register his/her CARFAX Guarantee | KC | Go to E | X |
| E | Did customer send CARFAX Consumer Affairs an email about this vehicle? | KC | Go to F | X |
| F | Did customer added comment about this vehicle in the CARFAX Customer Ratings & Comments Report & said owned it? | KC | Go to G | X |
| G | Send consumers survey. Did you buy this vehicle? | KC | NKC | Go to H |
| H | Did a CARFAX dealer run a Vehicle History Report on this VIN? | Go to I | Go to S | X |
| I | Is this dealer using Instant CARFAX Report on their Web site? | KC | Go to J | X |
| J | Is this dealer using Lemon Check on their Web site? | KC | Go to K | X |
| K | Did the dealer make a comment on this vehicle in the CARFAX Customer Ratings and Comments Report? | KC | Go to L | X |
| L | Did dealer add color & mileage vehicle listing via Inventory Manager? | KC | Go to M | X |
| M | Was the Report for this VIN run more than X times | Go to N | Go to N | X |
| N | Does this dealer average more than 50 Reports run per month? | Go to O | Go to O | X |
| O | Is this dealer's product mix of VH Reports to BTC Reports > 90% | Go to P | Go to P | X |
| P | Has this dealer ordered CARFAX Marketing material more than X in past 12 mo? | Go to Q | Go to Q | X |
| Q | Did you answer Yes to M, N, O and P? | KC | Go to R | X |
| R | Has there been more than X modifications to Inventory Manager in past 12 mo? | KC | Go to S | X |
| S | Send dealers a survey. Do you show a VHR to all customers when selling? | KC | UC | UC |
| T | Does the dealer use a competitor or another source of vehicle history? | UC | NKC | UC |

Key KC = Known Class where vehicle history is known by vehicle buyer
NKC = Not Known Class where vehicle history is NOT known by vehicle buyer
UC = Uncertain Class where knowledge of buyer is indeterminate
X = Not applicable

Figure 4

SYSTEM AND METHOD FOR DETERMINING VEHICLE PRICE ADJUSTMENT VALUES

BACKGROUND OF THE INVENTION

1. Field of the Invention

The present invention is directed to a system and method for determining price adjustment values for vehicles. In particular, the present invention is directed to such system and method in which price adjustments for a vehicle are provided based on the vehicle history attributes.

2. Description of Related Art

The vehicle industry is perhaps one of the largest industries in many industrialized regions of the world. As a result, the market for used vehicles, and especially automobiles, has evolved into a substantial market, especially in North America, and in particular, the United States and Canada.

Those parties involved in the trading of used vehicles recognize the value of information relating to the used vehicle's history in making a purchasing decision including determining a value of the particular vehicle. Consequently, services have been created that function primarily to provide vehicle history information to various parties in the used vehicle market, including dealers and individual consumers. For example, Carfax, Inc., the assignee of the present invention, provides a variety of vehicle history information to both buyers and sellers of vehicles. In particular, Carfax offers a web site at www.carfax.com, permitting a potential buyer or seller of a vehicle to purchase a vehicle history report containing an extensive collection of information on a particular vehicle. The vehicle history report may include such vehicle history information as model year, odometer readings, as well as vehicle history events such as accident information, the existence of salvage and/or flood titles, and maintenance records.

Until now, commercial services which offer valuations of used motor vehicles have been limited to providing generic valuations, i.e. a base price, based primarily on the make, model and year of the vehicle. With the advent of online databases, the commercial online valuation services have been able to factor in various vehicle information, such as the color or odometer reading of the specific vehicle, or the zip code in which the vehicle is being sold, to allow adjustment to the generic base price.

For example, Edmunds'® TMV Used Vehicle Appraiser (www.edmunds.com) requests the mileage, color, zip code, specific standard/optional equipment, and vehicle condition from the user of its databases to make adjustments to the base price for the particular make, model and year of vehicle. These adjustments to the base price for Trade-In, Private Party, and Dealer Retail transactions are displayed on the pricing report to reach a final adjusted price.

Kelley Blue Book® (www.kbb.com) has a similar process which permits an owner to assess the vehicle's condition as poor, fair, good, or excellent, or permits the consumer to answer specific questions to assess the condition of the vehicle. Likewise, NADA Guides™ (www.nadaguides.com) also has a similar process which allows the consumer to input a zip code and mileage before submitting a request for a pricing report. The pricing report displays a price for Low Retail, Average Retail, and High Retail. Average Retail price is noted for representing the price for a vehicle having a clean vehicle history record. The report also displays a mileage adjustment for the mileage submitted by the consumer.

Other online services, such as Consumer Guide™ (www-.consumerguide.com) that is powered by IntelliChoice®, provide information to dealers regarding potential customers in the market for a vehicle. After requesting the make, model, year, and standard/optional equipment, the valuation service requests the consumer to input fairly specific vehicle information regarding body damage, hail damage, amounts spent on unibody/frame and collision repairs, as well as data on emissions inspections, odometer reading, registration, and clean title/branded title(s). Consumer Guide™ also requests the consumer to answer questions about commercial use, purchase/sale at an auction, any Lemon Law claim, and any alterations made to the vehicle since it left the factory. Some of the requested information may be inputted manually by the consumer after reviewing a vehicle history report. Once these questions have been answered by the consumer, the online service provides such information to dealers who may be interested in taking the care as a trade in for another vehicle from the dealer's inventory. Unlike the other online vehicle pricing services, however, the Consumer Guide™ pricing report does not display specific adjustments by dollar amount or display the value of the vehicle.

Importantly, the available databases and online valuation services described above do not disclose how their pricing adjustments are derived. For example, the above discussed online valuation services generally do not disclose how price adjustment values to the base price of a vehicle are determined for any given vehicle specific information. In this regard, some of the online valuation services specifically disclaim the accuracy of the valuation by stating that the vehicle valuation provided by the online valuation service is an opinion only.

Moreover, the presently available databases and online valuation services do not provide substantially automated price adjustments for a used vehicle based on specific vehicle history information that relates only to the vehicle being valued. Instead, if such specific vehicle history information is used at all, the online valuation services rely upon the consumer to acquire and provide such information to the online valuation service. In particular, the above described attempts by the commercial vehicle valuation services to provide vehicle valuation services require interactively obtaining vehicle-specific data that is personally known to, or perceived by, the consumer. No vehicle valuation service substantially automatically obtains the breadth of information like the vehicle history data provided in the CARFAX® database. For example, as previously described, the Consumer Guide™ service requires the consumer to manually enter the vehicle history information that is requested.

Therefore, there exists an unfulfilled need for a system and method for determining vehicle price adjustments. In addition, there also exists an unfulfilled need for such a system and method in which vehicle price adjustments are provided based on vehicle history events. Furthermore, there exists an unfulfilled need for a system and method in which such vehicle price adjustments are substantially automatically provided to the user without requiring the consumer to provide vehicle information.

SUMMARY OF THE INVENTION

The above described vehicle valuation providers have tried to provide model level vehicle valuations which vary from vehicle to vehicle by interactively soliciting vehicle specific information from the user, and factoring the obtained vehicle specific information into the calculation of the value of the vehicle. However, the actual value of used vehicles varies based upon market conditions and vehicle attributes such as the specifications of the vehicle, vehicle condition, or other circumstances pertinent to the particular vehicle involved in the transaction which may not be known by the user. As described more fully below, the present invention provides an effective system and method for calculating price adjustment values for vehicle history attributes more accurately by utilizing empirical data to derive the price adjustment values. Correspondingly, the present invention solves the problems of the prior art and, in particular, allows more accurate determination of the value of a particular vehicle as compared to the prior art, with minimal user input.

In view of the foregoing, one aspect of the present invention is a system for determining price adjustments.

One advantage of the present invention is in providing such a system that calculates price adjustment values for vehicle history attributes based on actual sale transactions.

Another advantage of the present invention is in providing such a system that generates price adjustment values for a specific used vehicle accurately, with minimal user input.

Still another advantage of the present invention is in providing such a system that generates accurate price adjustments for a used vehicle substantially automatically based on vehicle history events specific to the used vehicle.

In accordance with another aspect of the present invention, a method for determining price adjustment values is provided which can be used in implementing the system noted above.

These and other advantages may be attained by a vehicle history information system in accordance with one aspect of the present invention which adapted to generate price adjustment values associated with vehicle history attributes. In one embodiment, the vehicle history information system comprises a vehicle history database, a transaction database, a vehicle history knowledge determination module, and a price adjustment module. The vehicle history database may include a plurality of vehicle history datasets related to a plurality of vehicles, each vehicle history dataset being related to a particular vehicle and having at least one vehicle history attribute regarding the vehicle. The transaction database may include a plurality of transaction records related to sale transactions of the plurality of vehicles, each transaction record being related to a particular vehicle and including at least a transaction date and a transaction price. The vehicle history knowledge determination module is adapted to determine whether a sale transaction related to a transaction record occurred with buyer's knowledge of the at least one vehicle history attribute associated with the vehicle of the transaction record. The vehicle history knowledge determination module is also adapted to classify each transaction record based on whether buyer possessed knowledge of the at least one vehicle history attribute associated with the vehicle of the transaction record. Finally, the price adjustment module is adapted to determine a price adjustment value for the at least one vehicle history attribute based on the vehicle history datasets and classification of the plurality of transaction records.

In accordance with another embodiment, a system for computing price adjustment values associated with vehicle history attributes is provided, the system comprising a database of a plurality of vehicle history datasets relating to a plurality of vehicles, each dataset having vehicle history attributes regarding a particular vehicle, and a processor adapted to determine a price differential between a price of a type of vehicle when plurality of vehicle history attributes associated with the type of vehicle are known to a vehicle buyer, and a price of the type of vehicle when vehicle history attributes associated with the type of vehicle are not known to a vehicle buyer, and to apportion the price differential between the vehicle history attributes to compute the price adjustment values.

In accordance with still another embodiment, a system for calculating price adjustment values associated with vehicle history attributes is provided, the system comprising a database of transactional records relating to sale transactions of a plurality of vehicles, each sale transaction including a buyer, a vehicle history knowledge determination module adapted to analyze whether each sale transaction occurred with buyer's knowledge of vehicle history attributes associated with a respective vehicle purchased by the buyer, and to classify the plurality of transaction records based on respective buyer's knowledge of the vehicle history attributes, and a price adjustment module adapted to determine price adjustment values for a plurality of vehicle history attributes based on the classification of the plurality of transaction records.

In accordance with another aspect of the present invention, a system for adjusting price of a used vehicle is provided in which the price of a used vehicle is adjusted using price adjustment values for vehicle history attributes which are determined based on vehicle history datasets and transaction records.

Another aspect of the present invention is in providing a method for generating price adjustments associated with vehicle history attributes. In accordance with one embodiment, the method comprises the steps of obtaining a plurality of vehicle history datasets relating to a plurality of vehicles, each dataset having vehicle history attributes regarding a particular vehicle, obtaining a plurality of transaction records relating to sale transactions of the plurality of vehicles, each transaction record including at least one of date and transaction price, analyzing whether sale transactions related to the plurality of transaction records occurred with knowledge by buyers of the plurality of vehicles as to vehicle history attributes associated with the plurality of vehicles, classifying the plurality of transaction records based on buyer's knowledge of the vehicle history attributes, and determining a price adjustment value for at least one of the vehicle history attributes based on the vehicle history datasets and classification of the plurality of transaction records.

In accordance with another embodiment, a method for computing price adjustment values associated with vehicle history attributes is provided, the method comprising the steps of obtaining a plurality of vehicle history datasets relating to a plurality of vehicles, each dataset having vehicle history attributes regarding a vehicle, determining a price differential between a price of a type of vehicle when a plurality of vehicle history attributes associated with the type of vehicle are known to a vehicle buyer, and price of the type of vehicle when vehicle history attributes associated with the type of vehicle are not known to a vehicle buyer, and apportioning the price differential between the vehicle history attributes to generate the price adjustment values.

In still another embodiment, a method for computing price adjustment values associated with vehicle history attributes is provided, the method comprising the steps of obtaining a plurality of transactional records relating to sale transactions of a plurality of vehicles, each sale transaction including a buyer, analyzing whether each sale transaction related to a respective transaction record occurred with the buyer's knowledge of vehicle history attributes associated with a respective vehicle purchased by the buyer, classifying said plurality of transaction records based on respective buyer's knowledge of said vehicle history attributes, and determining price adjustment values for a plurality of vehicle history attributes based on the classification of the plurality of transaction records.

Still another aspect of the present invention is providing a method for adjusting the price of a used vehicle using price adjustment values for vehicle history attributes that are determined based on vehicle history datasets and transaction records.

In accordance with yet another aspect of the present invention, a computer readable medium for generating price adjustments associated with vehicle history attributes is provided. In one embodiment, the computer readable medium comprises instructions for retrieving a plurality of vehicle history datasets relating to a plurality of vehicles, each dataset having vehicle history attributes regarding a particular vehicle, instructions for retrieving a plurality of transaction records relating to sale transactions of the plurality of vehicles, each transaction record including at least one of date and transaction price, instructions for analyzing whether sale transactions related to the plurality of transaction records occurred with knowledge by buyers of the plurality of vehicles as to vehicle history attributes associated with the plurality of vehicles, instructions for classifying the plurality of transaction records based on buyer's knowledge of the vehicle history attributes, and instructions for determining a price adjustment value for at least one of the vehicle history attributes based on the vehicle history datasets and classification of the plurality of transaction records.

In another embodiment, a computer readable medium for adjusting price of a used vehicle is provided, the computer readable medium comprising instructions for obtaining a plurality of vehicle history datasets relating to a plurality of vehicles, each of the datasets having vehicle history attributes regarding a particular vehicle, instructions for obtaining a plurality of transactional records relating to sale transactions of plurality of vehicles, each transaction record including at least one of date and transaction price, and instructions for determining price adjustment values for the vehicle history attributes based on the vehicle history datasets and the transaction records.

In still another embodiment, a computer readable medium for computing price adjustment values associated with vehicle history attributes is provided, the computer readable medium comprising instructions for obtaining a plurality of vehicle history datasets relating to a plurality of vehicles, each dataset having vehicle history attributes regarding a particular vehicle, instructions for determining a price differential between a price of a type of vehicle when plurality of vehicle history attributes associated with the type of vehicle are known to a vehicle buyer, and price of the type of vehicle when vehicle history attributes associated with the type of vehicle are not known to a vehicle buyer, and instructions for apportioning the price differential between the vehicle history attributes to generate the price adjustment values.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 3 shows a listing of various vehicle history attributes that may be provided in a vehicle history dataset stored in the vehicle history database.

FIG. 4 shows a listing of filter questions ordered in accordance with a filter logic in accordance with one embodiment of the present invention that may be used to determine whether a buyer of a vehicle had knowledge of vehicle history attributes.

DETAILED DESCRIPTION OF THE PREFERRED EMBODIMENT

Figure 1:
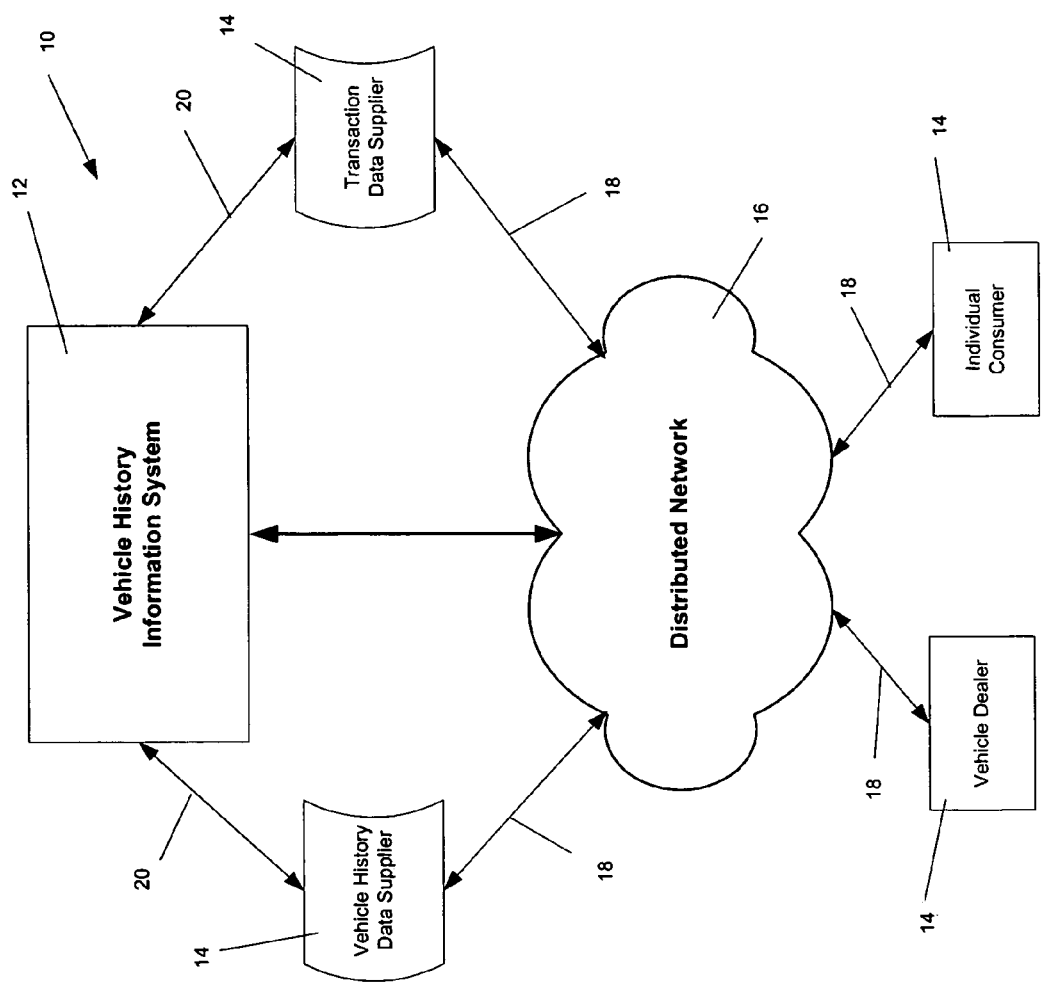
FIG. 1 is a general schematic illustration of a vehicle history information system in accordance with one embodiment of the present invention connected to various terminals and a distributed network.

FIG. 1 is a schematic diagram of a system in accordance with one example embodiment of the present invention which can be used to determine price adjustment values for vehicles. Initially, it should be understood that the term "vehicle" is used broadly herein to encompass a variety of transportation devices. For example, vehicles include automobiles of all types, motorized cycles including motorcycles and all terrain vehicles, boats, watercraft, airplanes, etc. In this regard, the present invention may be implemented in the manner described to determine price adjustment values for such vehicles. Thus, although the example embodiment discussed in detail below focuses on automobiles, it should be understood that the present invention is not limited thereto but may be implemented to determine vehicle price adjustment values for any vehicle.

FIG. 1 is a schematic diagram of a system, for example in the form of a computer network 10, designed to implement one embodiment of the subject invention. FIG. 1 may also be viewed as showing the relationship of the different entities potentially involved in the application of the present invention. Specifically, a computer implemented vehicle history information system 12 exchanges data with a plurality of remote terminals 14 through data transmission across a distributed network 16, e.g. Internet. The terminals 14 represent an individual consumer and a vehicle dealer accessing vehicle history information system 12, as discussed more fully herein below, to obtain vehicle history information and/or vehicle price adjustment values for a particular vehicle.

Terminals 14 may also include one or more vehicle history data sources or suppliers that allow the vehicle history information system administrator to create and update vehicle history information in system 12. The vehicle history data supplier may be individual consumers, vehicle dealers, state titling offices, Department of Motor Vehicles, auto auctions and/or any other source of vehicle information. In addition, terminals 14 may further include transaction data source or supplier that provides transaction records having various information regarding a sale transaction of a particular vehicle to allow the system administrator to accurately determine price adjustment values in accordance with the present invention. Such transaction records may generally include identification of the vehicle that is the subject of the sale transaction (such as VIN), transaction date, and transaction amount. Transaction data supplier may be, for example, automobile dealers, manufacturers, or other data suppliers that collect transaction data regarding sale of vehicles.

The terminals 14 may be in communication with the vehicle history information system 12 via distributed network 16. The distributed network 16 may be any type of communications channel such as a local area network (LAN), wide area network (WAN), direct computer connections, and/or wireless connections using radio frequency, infrared, or other wireless technologies using any appropriate communication hardware and protocols, and may further be the Internet.

Thus, terminals 14 may be connected to distributed network 16 by any communication links 18, including hardwired and/or wireless links. Moreover, the vehicle history data supplier and the transaction data supplier may provide information to vehicle history system administrator 12 via any means of effectively communicating vehicle history information, including conventional telephone, facsimile and/or mail services indicated at 20.

Figure 2:
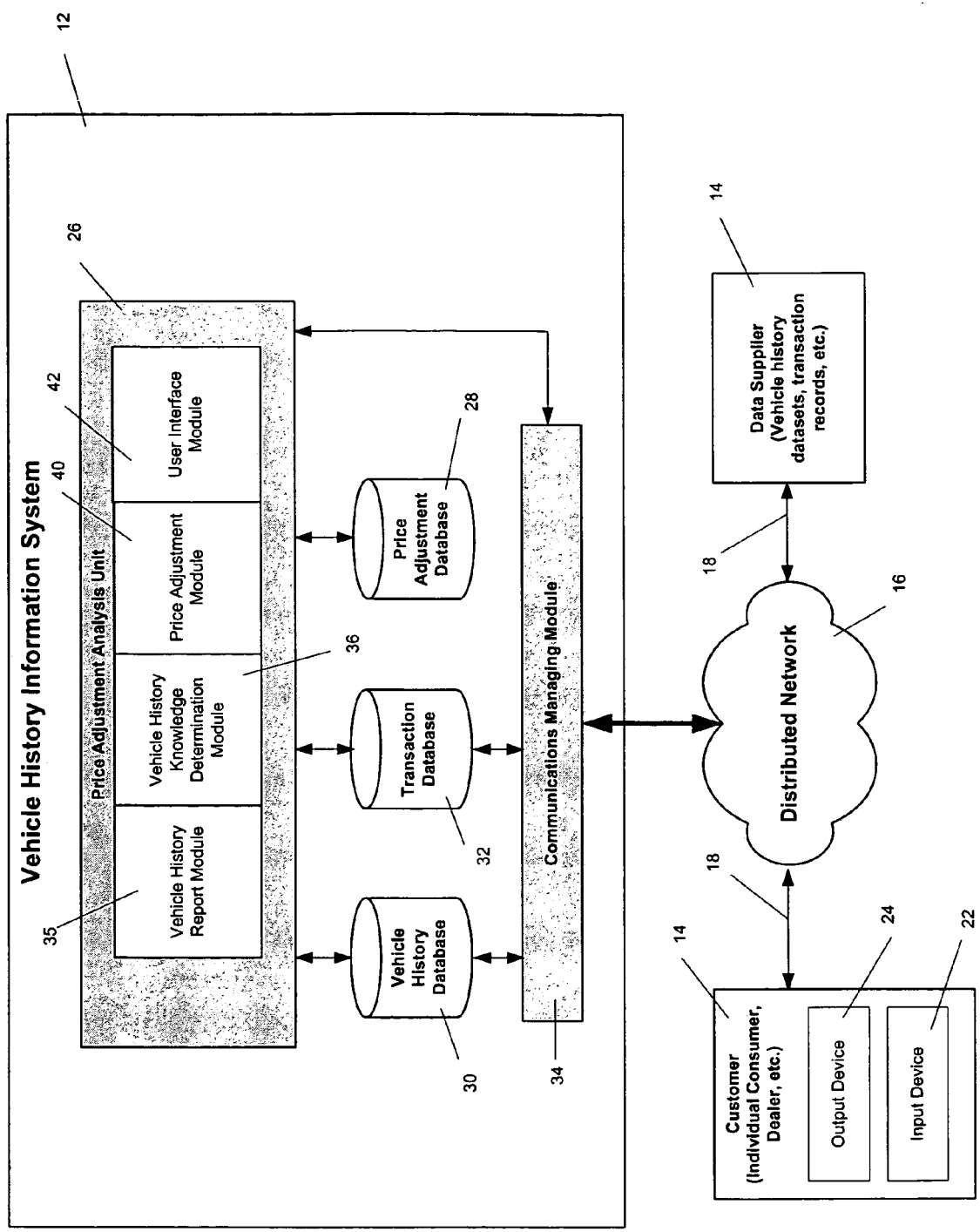
FIG. 2 is a detailed schematic illustration of the vehicle history information system in accordance with one implementation of the present invention.

FIG. 2 illustrates in more detail the vehicle history information system 12 in accordance with one example embodiment of the present invention. Generally, vehicle history information system 12 may be implemented with any type of appropriate hardware and software, with portions of the system residing in the form of computer readable storage medium having executable instructions, and computer architecture as discussed herein below. Vehicle history information system 12 may be implemented using a server, personal computer, a portable computer, a thin client, etc. or any combination of such devices. In this regard, vehicle history information system 12 may be a single device at a single location as shown, or multiple devices at a single, or multiple, locations that are connected together using any appropriate communication protocols over any communication medium such as electric cable, fiber optic cable, any other cable, or in a wireless manner using radio frequency, infrared, or other technologies.

FIG. 2 also illustrates in more detail the preferred implementation of the terminals 14. Although only one terminal is shown in detail as the customer terminal which represents the individual consumers and vehicle dealers of FIG. 1, the details of the customer terminal 14 are equally applicable to the data supplier terminal and/or other terminals. Terminal 14 may be any appropriate device for accessing vehicle history information system 12 such as a personal computer, portable computer, thin client, a handheld device such as a mobile phone or PDA, and the like. Terminal 14 includes an input device 22 and an output device 24 which allow the user of the terminal 14 to provide information to, and receive information from, the vehicle history information system 12 via the distributed network 16. In this regard, the input device 22 may include a keyboard, mouse, etc. as well as data input devices such as memory devices based on magnetic, optical and/or solid state technologies including disc drives, CD/DVD drives, flash memory, etc. The output device 24 may include a monitor screen, printer, etc. that allow the user of the terminal 14 to obtain the vehicle history attribute information and/or price adjustment value information from vehicle history information system 12.

Referring again to FIG. 2, in the preferred embodiment, vehicle history information system 12 includes a price adjustment analysis unit 26, a price adjustment database 28, a vehicle history database 30, a transaction database 32, and a communications managing module 34, all of which are connected together for effective data communication. Price adjustment analysis unit 26 in the implementation shown includes a vehicle history report module 35, a vehicle history knowledge determination module 36, a price adjustment module 40, and a user interface module 42, the functions of each being further described herein below.

Vehicle history database 30 contains a plurality of vehicle history datasets which are comprehensive collections of vehicle history data arranged, organized, indexed and/or retrievable based on the unique vehicle identification number (such as VIN for automobiles) of a particular vehicle. Each vehicle sold within the United States and most foreign countries has a unique identification number which is identified on nearly every vehicle title issued and physically identified on the respective vehicle. The identification is the key to identifying and tracing the public record of each particular vehicle and to associating different vehicle data collected from a variety of sources with the particular vehicle.

It should be noted that the vehicle history information system 12 and the price adjustment analysis unit 26 in accordance with the embodiment of the present invention is illustrated and discussed herein as having various modules which perform particular functions. It should be understood that these modules are merely schematically illustrated based on their function for clarity purposes, and do not necessarily represent specific hardware or software. In this regard, these modules, units and other components may be hardware and/or software implemented to substantially perform their particular functions explained herein. The various functions of the different modules and units can be combined or segregated as hardware and/or software modules in any manner, and can be used separately or in combination. Thus, the present invention as schematically embodied in FIG. 2 should not be construed to limit the vehicle history information system 12 of the present invention, but be understood to be merely a schematic example.

It should be clarified that as used herein, the term "vehicle" generally refers to only one particular, physical vehicle associated with a single identification number and does not refer to general model level information or categories of vehicles. Such general model level information relating to a specific make, model and/or year, is referred to as "type" of vehicle herein. Thus, the vehicle history database 30 has a plurality of vehicle history datasets related to a plurality of vehicles, each vehicle history dataset being related to a particular vehicle and having vehicle history attributes regarding the vehicle as described below.

As previously mentioned, the administrator of vehicle history information system 12 acquires vehicle history datasets from a variety of data suppliers 14 including the vehicle history data supplier and the transaction data supplier. The vehicle history datasets from the vehicle history data supplier which are entered into vehicle history database 30 are associated with a particular identification number and thus, a particular vehicle. The vehicle data forming the vehicle history datasets are added as records to vehicle history database 30 and indexed by the identification number. The vehicle history datasets may be utilized by the vehicle history information system 12 in any appropriate manner. For example, the vehicle history datasets may be utilized by the vehicle history report module 35 to generate a report by retrieving vehicle history records associated with the requested identification number of a particular vehicle.

Vehicle history database 30 may be any appropriately implemented database capable of effectively storing collections of vehicle history data of vehicle history datasets in an organized accessible manner to permit efficient easy access to desired pieces of data, i.e. one or more records associated with a particular identification number, using appropriate database management system software. Preferably, vehicle history database 30 receives information from, and may be accessed by, various components of vehicle history information system 12.

The vehicle history datasets stored in the vehicle history database 30 preferably include vehicle history attributes which are vehicle history data that provide specific information which may affect a used vehicle's value in the market. Such vehicle history attributes may include accident information, such as salvage title, junk title, flood damage, fire damage, police accident report and damage disclosure information; mileage information, such as odometer problems and actual mileage listings; title/registration events including government registration, taxi registration and commercial registration; stolen vehicle information; fleet information; emissions and safety inspection information; recall information, number of owners, and any other information relevant to the vehicle's history and the vehicle's value. Such other information may be geographical location of the vehicle, color if the vehicle, etc., for example.

Additionally, whereas many of the above noted vehicle history attributes would generally reduce the value of the used vehicle, some of the vehicle history attributes may increase the used value of the vehicle as well, depending on the attribute. For example, a value of a used vehicle may be increased if the vehicle was used in a geographical region having a temperate climate. In another example, a value of a used vehicle may be increased if the number of previous owners is significantly lower than expected for the age of the vehicle. Of course, the converse may be true in that the value of the used vehicle may be reduced if the vehicle was used in a harsh geographical region or has a significantly higher number of previous owners than expected for the age of the vehicle.

In the above regard, FIG. 3 shows a listing of numerous vehicle history attributes that may be identified and stored in the vehicle history database 30 in a dataset associated with a particular vehicle. Most of the vehicle history attributes listed in FIG. 3 are self explanatory. More specifically, "Air Bag Deployed" vehicle history attribute indicates that the particular vehicle's air bag has deployed which means that the particular vehicle was in an accident. "Abandoned" vehicle history attribute indicates that the particular vehicle was abandoned by an owner for some reason. "Accident" vehicle history attribute indicates that the particular vehicle was in an accident. "Assembled" vehicle history attribute indicates that the particular vehicle was assembled from a kit instead of being assembled at a factory of a vehicle manufacturer. "Auction Vehicle Offered" vehicle history attribute indicates that the particular vehicle was previously offered for sale at an auction whereas "Auction Vehicle Sold" vehicle history attribute indicates that the particular vehicle was actually sold.

"Child Lien Added" vehicle history attribute also listed in FIG. 3 indicates that a secondary lien has been added to the ownership rights to the particular vehicle. "Child Lien Removed" vehicle history attribute indicates that the secondary lien to the ownership rights to the particular vehicle has been removed. "Commercial Vehicle" vehicle history attribute indicates that the particular vehicle was registered for commercial use. "New Owner" vehicle history attribute indicates that the ownership for the particular vehicle changed from one party to another. "Cert. Pre-Owned Vehicle" vehicle history attribute indicates that the particular vehicle is a certified used vehicle which has been inspected and determined by, for example, the dealer, to meet the requirements established by, for example, the manufacturer for certification that provides indication of condition and reliability of the particular vehicle.

"Curbstoning" vehicle history attribute indicates that the particular vehicle was sold by a dealer posing as a private owner of the vehicle, such sale tactics being generally employed when there is something wrong with the vehicle and the dealer wants to deceive the buyer and not disclose the problems of the vehicle. "Crash Test Vehicle" vehicle history attribute indicates that the particular vehicle was used in vehicle crash testing. "Damaged by Fire" vehicle history attribute indicates that the particular vehicle, at one time, was on fire. "Damage Disclosure" vehicle history attribute indicates that damage to the particular vehicle was reported, for example, by the owner. "Dismantled Title" vehicle history attribute indicates that the particular vehicle was dismantled for parts or recycling, for example, by a salvage yard. "Emissions Inspection Failed" vehicle history attribute indicates that the particular vehicle failed emissions testing while "Emissions Inspection Passed" vehicle history attribute indicates that the particular vehicle passed emission testing.

"First Owner" vehicle history attribute indicates that the indicated registrant of the particular vehicle is the first owner. "Fire Damaged" vehicle history attribute indicates that the particular vehicle was damaged in a fire whereas "Flood Damaged" vehicle history attribute indicates that the particular vehicle was damaged due to water. "Fleet Vehicle" vehicle history attribute indicates that the particular vehicle was used in a commercial fleet, for example, as a company vehicle. "Grey Market" vehicle history attribute indicates that the particular vehicle was originally manufactured for use in another country but was imported by a dealer, and the manufacturer's warranty may be void. "Gross Polluter" vehicle history attribute indicates that the particular vehicle has emissions problems and does not meet emission requirements. "Government Vehicle" vehicle history attribute indicates that the particular vehicle was registered for use by a government agency which may indicate severe usage. "Hail Damaged" vehicle history attribute indicates that the particular vehicle has incurred body damage caused by hail. "Junk Title" vehicle history attribute indicates that the particular vehicle is no longer suitable for use on public roads.

"Lien 1 Reported" vehicle history attribute indicates that a lien has been placed on the rights to the ownership of the particular vehicle, for example, by a bank, while "Lien 2 Reported" vehicle history attribute indicates that a second lien has been placed on the rights to the ownership of the particular vehicle, for example, a lien from another bank or a mechanic's lien. "Lease Vehicle" vehicle history attribute indicates that the particular vehicle was leased instead of purchased. "Lemon Law Vehicle" vehicle history attribute indicates that the particular vehicle was defective at the time of manufacture and the manufacturer was forced to re-purchase the particular vehicle back from the owner under state law. "Not Actual Mileage" vehicle history attribute indicates that the particular vehicle's odometer does not show the actual mileage of the vehicle. "Non-Branded Buyback" vehicle history attribute indicates that the particular vehicle was purchased back by the manufacturer without establishing that the particular vehicle was a lemon under the lemon law, thus, not requiring a lemon law vehicle history attribute.

"Number of Owners" vehicle history attribute indicates that the particular vehicle has had the indicated number of owners. "Non-legal High Way" vehicle history attribute indicates that the particular vehicle cannot be used on public roads, for example, if the particular vehicle is a race car. "Non Profit" vehicle history attribute indicates that the particular vehicle was registered or owned by a not for profit organization. "Odometer Actual" vehicle history attribute indicates that the particular vehicle's odometer shows the actual mileage of the particular vehicle while "Odometer Rollback" vehicle history attribute indicates that the odometer has potentially been tampered with to show a mileage less than the actual mileage of the particular vehicle. "Odometer Rollover" vehicle history attribute indicates that the mileage of the particular vehicle exceeded the five digit mechanical limits of the vehicle's odometer, i.e. beyond 99,999 miles, causing the odometer to be reset to zero.

"Police Vehicle" vehicle history attribute indicates that the particular vehicle was registered for police use which suggests severe usage. "Private Vehicle" vehicle history attribute indicates that the particular vehicle was registered to a private individual. "Recall" vehicle history attribute indicates that the particular vehicle was subject to a recall by the government and/or manufacturer. "Rebuilt Vehicle Title" vehicle history attribute indicates that the particular vehicle was in a serious accident but was rebuilt to be suitable for use. "Rental Vehicle" vehicle history attribute indicates that the particular vehicle was registered for use in a rental fleet which suggests severe usage. "Reported Stolen" vehicle history attribute indicates that the particular vehicle was reported to a law enforcement agency as being stolen. "Reported Veh. Damage" vehicle history attribute is the same as the "Damage Disclosure" vehicle history attribute and indicates that damage has been reported for the particular vehicle, for example, by the owner. "Repossessed" vehicle history attribute indicates that the particular vehicle was recovered by a party such as a bank that has ownership rights to the vehicle. "Safety Insp. Failed" vehicle history attribute indicates that the particular vehicle failed an inspection required in many jurisdictions, and by some insurance companies, to ensure road worthiness of vehicles whereas "Safety Insp. Passed" vehicle history attribute indicates that the particular vehicle passed such an inspection.

"Salvaged Title" vehicle history attribute indicates that the particular vehicle was in a severe accident and was repurchased by the insurance company. "Taxi Vehicle" vehicle history attribute indicates that the particular vehicle was registered for use as a taxi. "Theft Recovery" vehicle history attribute indicates that the particular vehicle was stolen, but then was recovered. "Title Issued" vehicle history attribute indicates that a title was issued by an authorized agency for the particular vehicle, and similarly, "Title/Regist. Issued" vehicle history attribute indicates that a title registration was issued for the particular vehicle. "Total Loss" vehicle history attribute is the same as "Salvage. Title" vehicle history attribute and indicates that the particular vehicle was in an accident and that the total value of the vehicle was paid to the insured by the insurance company that insured the vehicle, rather than paying for the repair of the vehicle. "Vehicle Repaired" vehicle history attribute indicates that the particular vehicle had a particular problem which was repaired. "Vehicle Serviced" vehicle history attribute indicates that the particular vehicle was serviced for routine maintenance.

Of course, the vehicle history attributes that are listed in FIG. 3 and discussed above are merely examples and other vehicle history attributes may also be stored in the vehicle history database 30 as well. Preferably, the vehicle history attributes are any data that may effect the price of the used vehicle. This information may be retrieved, processed and/or displayed in any desired manner, for example, retrieved and processed by the vehicle history report module 35 to create corresponding vehicle history reports for a particular VIN that can be displayed by the user interface module 42.

In a similar manner, the transaction database 32 may be any conventional database capable of effectively storing collections of sale transaction records in an organized accessible manner using appropriate database management system software which allows efficient and easy access to desired pieces of data. As noted, transaction records may generally include identification of the used vehicle that is the subject of the sale transaction such as VIN for automobiles, as well as specific information regarding the transaction such as the transaction date, and transaction amount. The transaction database 32 allows one or more transaction records associated with a particular identification number to be retrieved from the transaction database 32. As previously noted, sale transaction information may be provided by a data supplier such as automobile dealers, manufacturers, or other data suppliers. Of course, whereas in the present invention, the transaction database 32 and vehicle history database 30 are illustrated as separate databases, it should be evident that in other embodiments of the present invention these databases may be combined into an integral database having both the vehicle history datasets and the transaction records therein.

The vehicle history information system 12 in accordance with the illustrated embodiment of FIG. 2 further includes price adjustment database 28 adapted to store calculated price adjustment values for vehicle history attributes, examples of vehicle history attributes being listed in FIG. 3 as previously noted. The price adjustment values are each indicative of a specific vehicle history attribute's impact or effect on the value of the particular used vehicle. For example, if a particular vehicle has been in a major accident or has a salvage title, such vehicle history attributes can be expected to lower the value of the particular used vehicle by a certain amount. By providing price adjustment values that correspond to the vehicle history attributes, the value of the particular used vehicle may be accurately adjusted to reflect such vehicle history attributes, such attributes being provided by the vehicle history database 30. The price adjustment values may be expressed in any appropriate manner such as a fixed amount, a percent of the value of the vehicle, or using another mathematical formula or model. As will be explained in further detail below, such price adjustment values are calculated using the available vehicle history data from the vehicle history database 30 and the transaction records from the transaction database 32.

In the preferred embodiment shown, a price adjustment analysis unit 26 includes appropriate hardware and software for implementing the vehicle history report module 35, the vehicle history knowledge determination module 36, the price adjustment module 40, and the user interface module 42, each module performing the functions as described in detail below. In this regard, price adjustment analysis unit 26 may be implemented as a general purpose computing device with a central processing unit (CPU) or processor. The software for operating the price adjustment analysis unit 26 and the various modules may reside in a computer readable storage medium in the form of encoded executable instructions that operate the vehicle history information system 12 and perform the functionalities and process steps described.

In particular, the vehicle history report module 35 functions to access vehicle history database 30 to retrieve appropriate vehicle history records associated, for example, with a particular VIN that is requested by a user of the vehicle history information system 12. Thus, the vehicle history module 35 includes the appropriate software necessary to identify the appropriate vehicle history dataset from the vehicle history database 30, and to retrieve vehicle history data based on a particular request, for example, based on a particular VIN. The vehicle history report module 35 may further be adapted to arrange and organize the vehicle history data and information in a manner appropriate for further data processing and/or display as a vehicle history report via the user interface module 42 described below.

User interface module 42 is adapted to generate a user interface or output for delivery to output device 24 of customer terminal 14. In particular, the user interface module 42 may be adapted to generate particular electronically displayable files for delivery to, and display by, output device 24 of customer terminal 14. For example, the user interface module 42 may utilize the information provided by the vehicle history report module 35 and/or price adjustment module 40 described in further detail below to generate an output which is provided to the output device 24 of terminal 14. Communications managing module 34 is adapted to manage communications and interactions between vehicle history information system 12 and its various components, as well as with the various terminals 14 via the distributed network 16.

As noted above, the price adjustment values that are retrievably stored in the price adjustment database 28 are calculated using the available vehicle history datasets from the vehicle history database 30 and the transaction records from the transaction database 32. This is attained by the vehicle history knowledge determination module 36 and the price adjustment module 40 of the price adjustment analysis unit 26 in accordance with the illustrated embodiment, the details of these modules being described below.

The vehicle history knowledge determination module 36 of the price adjustment analysis unit 26 is adapted to determine buyer's knowledge of one or more vehicle history attributes for the particular vehicle of a transaction. More specifically, the illustrated embodiment of the vehicle history knowledge determination module 36 is adapted to determine whether sale transactions related to the transaction records stored in the transaction database 32 occurred, or likely occurred within a particular degree of certainty, with the buyer's knowledge of one or more of the vehicle history attributes associated with the vehicle of the transaction record being analyzed.

In the above regard, the present application generally refers to buyer's knowledge, or utilizes the phrase "buyer knew" in discussing whether a sale transaction related to a transaction record occurred with buyer's knowledge of at least one vehicle history attribute. As discussed, it should be understood that such references to buyer's knowledge of at least one vehicle history attribute includes actual knowledge, as well as a determination of buyer's knowledge by inference within a specific degree of certainty.

In addition, in the illustrated embodiment discussed, the vehicle history knowledge determination module 36 can also determine whether sale transactions related to the transaction records occurred, or likely occurred within a particular degree of certainty, without the buyer's knowledge of one or more of the vehicle history attributes. In this regard, the present application generally refers to buyer's lack of knowledge, or utilizes the phrase "buyer did not know" in discussing whether a sale transaction related to a transaction record occurred with buyer's knowledge of at least one vehicle history attribute. Again, it should be understood that such references to buyer's lack of knowledge of at least one vehicle history attribute includes actual lack of knowledge, as well as a determination of buyer's lack of knowledge by inference within a particular degree of certainty. Moreover, the vehicle history knowledge determination module can also determine if the knowledge of the buyer during the sale transaction cannot be determined for whatever reason.

The determination as to buyer's knowledge (actual or inferred) of one or more of the vehicle history attributes may be attained in any appropriate manner, such as based on one or more filter questions which are analytical tools that may be used by the vehicle history knowledge determination module 36. For instance, this determination may be based on buyer's interaction with the vehicle history database 30 of the vehicle history information system 12 via the user interface module 42 regarding the particular vehicle being analyzed. More specifically, buyer's interaction may include the buyer's action of requesting a vehicle history report from the vehicle history report module 35 for the used vehicle being analyzed via the user interface module 42. The buyer's interaction may alternatively be acknowledgement that a vehicle history report for the vehicle being analyzed was used in a sale transaction relating to sale of the particular vehicle being analyzed. The interaction may also be registration of the particular vehicle in a title guarantee associated with the vehicle history information system 12 and/or provision of comments regarding the particular vehicle being analyzed.

All of these interactions can be determined using filter questions, whereby answers to such filter questions provide an indication or inference as to whether the buyer of the particular used vehicle for the transaction record being analyzed knew of the vehicle history attributes, or that the buyer did not know of the vehicle history attributes. Of course, the above noted interactions of the buyer with the vehicle history information system 12 are merely examples of interactions that can be used by the vehicle history knowledge determination module 36 in determining buyer's knowledge of the vehicle history attributes.

Alternatively, knowledge of the buyer as to one or more of the vehicle history attributes may be determined by the vehicle history knowledge determination module 36 based on access data indicating access to the vehicle history dataset in the vehicle history database 30 which relate to the vehicle being analyzed, and based on a transactional record relating to the vehicle being analyzed in the transaction database 32. More specifically, the vehicle history knowledge determination module 36 may be adapted to determine whether the identity of a user who accessed the vehicle history dataset in the vehicle history database 30 regarding the particular vehicle is also identified as a purchaser or buyer in a transaction record relating to sale transaction of the vehicle being analyzed. A match in the identity provides an indication that the buyer likely had knowledge of the vehicle history attributes. Again, this determination may be made using filter questions or in any other appropriate manner.

Of course, other techniques may alternatively be used to determine whether a sale transaction occurred with/without buyer's knowledge of the particular vehicle's vehicle history attributes. For example, the vehicle history knowledge determination module 36 may determine buyer's knowledge based on filter questions that provide specific knowledge or an indication as to the likelihood that the seller of the used vehicle provided prospective purchasers with a vehicle history report generated by the vehicle history report module 35, or the information on such a report.

In the above regard, the vehicle history knowledge determination module 36 may implement a filter logic as set forth in FIG. 4 in which answers to a series of filter questions serve as a basis for determining buyer's knowledge of the particular vehicle's vehicle history attribute at the time of the sale transaction of a transaction record. For example, filter question A of FIG. 4 queries whether a consumer of Carfax® ran a vehicle history report on the VIN being analyzed. If the answer is yes, filter question B is queried in which a determination is made as to whether there is some buyer identification available in the transaction record that is related to the sale transaction of the VIN. If so, then filter question C is queried, and so forth.

It should be understood that the filter questions referred to above and samples of which are set forth in FIG. 4 need not be actual questions that are posed to a user of the vehicle history information system 12. Rather, these filter questions represent factual inquiries for which answers can be provided directly by the user of the vehicle history information system 12, or derived inferentially by the vehicle history knowledge determination module 36 itself or an administrator of the system based on other facts or information available to the vehicle history information system 12. For example, such information may be access data noted above that indicates access to the vehicle history dataset in the vehicle history database 30.

As described, the filtration questions implemented using the filter logic as set forth in FIG. 4 allow the vehicle history knowledge determination module 36 to determine whether sale transactions related to the transaction records stored in the transaction database 32 occurred with buyer's knowledge of the vehicle history attribute(s) associated with the particular vehicle of the transaction record being analyzed. The filtration questions also allow determination of whether the sale transactions occurred without buyer's knowledge of the vehicle history attribute(s), or if buyer's knowledge of the vehicle history attribute(s) cannot be determined.

In addition, as can be appreciated by careful examination, the filtration questions also allow inferential determination of the buyer's knowledge based on behavior of the seller and/or buyer identified in the transaction record when specific confirming information is not readily available or determinable. For example, in filtration question S, the fact that the dealer selling the vehicle generally provides vehicle history reports to prospective customers is used to infer that the buyer of the vehicle did have knowledge of the vehicle history attributes associated with the particular vehicle. Furthermore, it should also be noted that FIG. 4 provides filter questions that are specific to Carfax® vehicle history services. However, similar filter questions or alternative filter questions and/or filter logic may be utilized to determine the buyer's knowledge regarding the vehicle history attributes.

Moreover, the answers to the filter questions as set forth in FIG. 4 allow the vehicle history knowledge determination module 36 of the price adjustment analysis unit 26 to classify each transaction record based on the buyer's knowledge, or lack thereof, regarding the vehicle history attributes associated with the particular vehicle. In the present embodiment, the vehicle history knowledge determination module 36 is also adapted to classify the transaction records of the transaction database 32 into classes including a "Known Class" in which sale transaction occurred with buyer's knowledge of the vehicle history attributes, a "Not Known Class" in which sale transaction occurred without buyer's knowledge of the vehicle history attributes, and an "Uncertain Class" where the buyer's knowledge of the vehicle history attributes is indeterminate. Thus, the "Known Class" would contain transaction records in which the sale transactions occurred, or likely occurred, with buyer's knowledge of the vehicle attributes whereas the "Not Known Class" would contain transaction records in which the sale transactions occurred, or likely occurred, without buyer's knowledge of the vehicle attributes.

For example, referring again to the filter questions set forth in FIG. 4, if a transaction record satisfies filter question C, the transaction record is determined by the vehicle history knowledge determination module 36 to be in the Known Class which is designated as "KC" in FIG. 4. If the sale transaction of the transaction record is determined to have occurred without buyer's knowledge of the vehicle history attributes for filter question H, the transaction record is determined to be in the Not Known Class by the vehicle history knowledge determination module 36 which is designated as "NKC" in FIG. 4. However, if the buyer's knowledge of the vehicle history attributes are indeterminate, for example, in filter question T, the transaction record is determined to be in the Uncertain Class by the vehicle history knowledge determination module 36 which is designated as "UC" in FIG. 4.

As described in further detail below, the price adjustment module 40 of the price adjustment analysis unit 26 is adapted to determine price adjustment values for the vehicle history attributes based on the vehicle history datasets stored in the vehicle history database 30 and classification of the plurality of transaction records in the transaction database 32 as attained by the vehicle history knowledge determination module 36 in the manner described above, for example. The price adjustment module 40 determines the price adjustment values for the vehicle history attributes such as those listed in FIG. 3 based on transaction records that are in the Known Class, as well as the transaction records that are in the Not Known Class, transaction records in the Uncertain Class not being used in the present embodiment.

The price adjustment module 40 of the illustrated embodiment is adapted to process the plurality of transaction records that are classified by the vehicle history knowledge determination module 36 in the Not Known Class. For example, the price adjustment module 40 of the illustrated embodiment may be adapted to determine an average transaction price from the transaction records in the Not Known Class for vehicles having the same, or similar, parameters. In this regard, the average transaction price for a type of vehicle may be calculated, i.e., for vehicles having the same make, model and year. This provides a baseline price for a type of vehicle when the vehicle history attributes are not known. It should be understood that as used herein, the term "vehicle parameter" refers to any information or data that may be used to categorize or group the transaction records that are used by the price adjustment module 40 for its processing. Thus, such vehicle parameters may include the type of vehicle as noted (make, model and year) but may further include other parameters such as mileage, color, location, options, or even any of the vehicle history attributes referred to in FIG. 3.

Of course, in alternative implementations, the price adjustment module 40 may be adapted to process the plurality of transaction records to determine other values, for example, mean transaction price. In addition, various other vehicle parameters may also be used by the price adjustment module 40 to categorize or create a focused group of transaction records related to vehicles having one or more similar, or the same, vehicle parameters.

In accordance with the preferred embodiment, the price adjustment module 40 is further adapted to identify the transaction records for vehicles classified in the Known Class that have the same, or similar, vehicle parameters. Using these identified transaction records, the price adjustment module 40 calculates a price differential between the transaction price associated with a transaction record in the Known Class, and the average transaction price that was determined using transaction records in the Not Known Class. In this regard, a plurality of price differentials are calculated from the transaction records in the Known Class so as to provide higher level of accuracy and confidence in the price adjustment values that are derived therefrom.

The price adjustment module 40 then determines the price adjustment values by attributing the calculated price differential to the vehicle history attributes for the used vehicles of the transaction records in the Known Class. Thus, the price adjustment values are determined based on the presumption that the differences in prices between used vehicles for which vehicle history attributes are known/likely to be known, and used vehicles for which vehicle history attributes are not known/likely to be not known, are directly attributable to the specific vehicle history attributes identified in the vehicle history datasets of the particular vehicles in which the vehicle history attributes are known by the buyers. In particular, the vehicle history attributes for each used vehicle may be mathematically modeled as an equation. For example, the values of the vehicle history attributes may be expressed as variables which are multiplied with the price adjustment values which may be expressed as unknown constants of the equations, the sum of the products of the variables and constants for each used vehicle equaling the determined price differential for each vehicle. This results in a plurality of equations relating to each type of vehicle, each equation having a plurality of constants, i.e. price adjustment values, that can be calculated by the price adjustment module 40 by apportioning the price differential to the vehicle history attributes.

In the preferred embodiment, multivariate analysis may be performed in which the plurality of equations are solved simultaneously to calculate the price adjustment values, i.e. the unknown constants of the equations. Such mathematical techniques for solving for multiple variables are known in the field of mathematics and thus, are not discussed in detail here. Thus, the price adjustment values are calculated using empirical data based on the actual sale prices of the transaction records such that the price adjustment values accurately reflect the impact of the vehicle history attributes on the market value of a used vehicle.

The calculated price adjustment values are then retrievably stored in the price adjustment database 28 for use in any appropriate manner. For example, the price adjustment values may be displayed by the user interface module 42 of the vehicle history information system 12 to a user requesting information about a particular vehicle in conjunction with a vehicle history report generated by the vehicle history report module 35. Only the price adjustment values that are relevant for the vehicle, i.e. those corresponding to vehicle history attributes present in the vehicle history report, may be displayed so that the user of the vehicle history information system 12 can take into consideration the impact of vehicle history attributes on the actual value of the particular vehicle. Alternatively, an actual base price of the vehicle may be obtained and adjusted using the calculated price adjustment values in the manner further described below to thereby provide accurate valuation of a particular vehicle based on its history. When another user requests information about another used vehicle, the price adjustment values that are relevant for the vehicle can be retrieved from the price adjustment database 28 and displayed so that adjustments to the price of the used vehicle can be made.

In the above described implementation, to enhance the accuracy of the price adjustment values calculated, the transaction records classified in the Not Known Class and the Known Class may be windowed by the pricing adjustment module 40 or the vehicle history knowledge determination module 36 so that only transaction records having a transaction date within a predetermined time window is used to determine the average transaction price. Moreover, the price adjustment values stored in the price adjustment database 28 can be periodically updated in accordance with the method described above. This will ensure that the transaction records used to determine the price adjustment values are reflective of current market conditions and are not skewed by transaction records that are outdated and no longer accurately reflect present market conditions. The window may be one year or even shorter such as six months so that only the sale transactions that occurred within the time window are used.

Moreover, it should be noted that, preferably, the mathematically modeled equations from which price differentials are determined by the price adjustment module 40 is for the same type of vehicle having the same vehicle parameters. This would provide accurate price adjustment values for a particular vehicle type, for example, price adjustment values for 1999 Honda Accords. Of course, in alternative embodiments, price adjustment values that are generic to all types of vehicles may be calculated by determining the price adjustment values at an aggregate level using mathematically modeled equations for a variety of different types of vehicles or based on other vehicle parameters. Such an alternative embodiment may be desirable, for example, if there are not enough transaction records for one type of vehicle to determine statistically accurate price adjustment values, for example, for high end sports cars.

As noted above, in accordance with another example implementation, the price adjustment module 40 may further be adapted to provide valuation for a used vehicle using the price adjustment values that are retrievably stored in the price adjustment database 28. In particular, a base price for a used vehicle may be obtained and adjusted using the price adjustment values based on the vehicle history attributes set forth in the vehicle history dataset related to the particular used vehicle. The base price information of vehicles may be obtained from various third party databases and online services that provide such pricing information. For example, base price for the particular type of vehicle may be obtained from third party pricing databases such as Kelley Blue Book® (www.kbb.com), NADA Guides™ (www.nadaguides.com), Edmunds® (www.edmunds.com), or any other appropriate sources. As previously described, the base price of vehicles as provided by such third party databases represent general used car prices for a particular type of vehicle which takes into consideration the year, make, model and mileage of the vehicle, as well as some other general information such as options. However, such databases do not have vehicle history datasets associated with particular vehicles that set forth detailed information regarding vehicle history attributes which will effect vehicle values in the marketplace.

Hence, it should now be evident that the present invention allows facilitated adjustments to the base price based on each of the vehicle history attributes associated with the used vehicle using the price adjustment values calculated as described herein to provide vehicle valuation that more accurately reflects the actual value of the used vehicle. Thus, in such an implementation, the adjusted price of the vehicle itself may be displayed by the user interface module 42 to the user of the vehicle history information system 12. Moreover, such price adjustment values and adjustments to the base price are provided in a substantially automated manner with minimal input from the user of the vehicle history information system 12.

Figure 5:
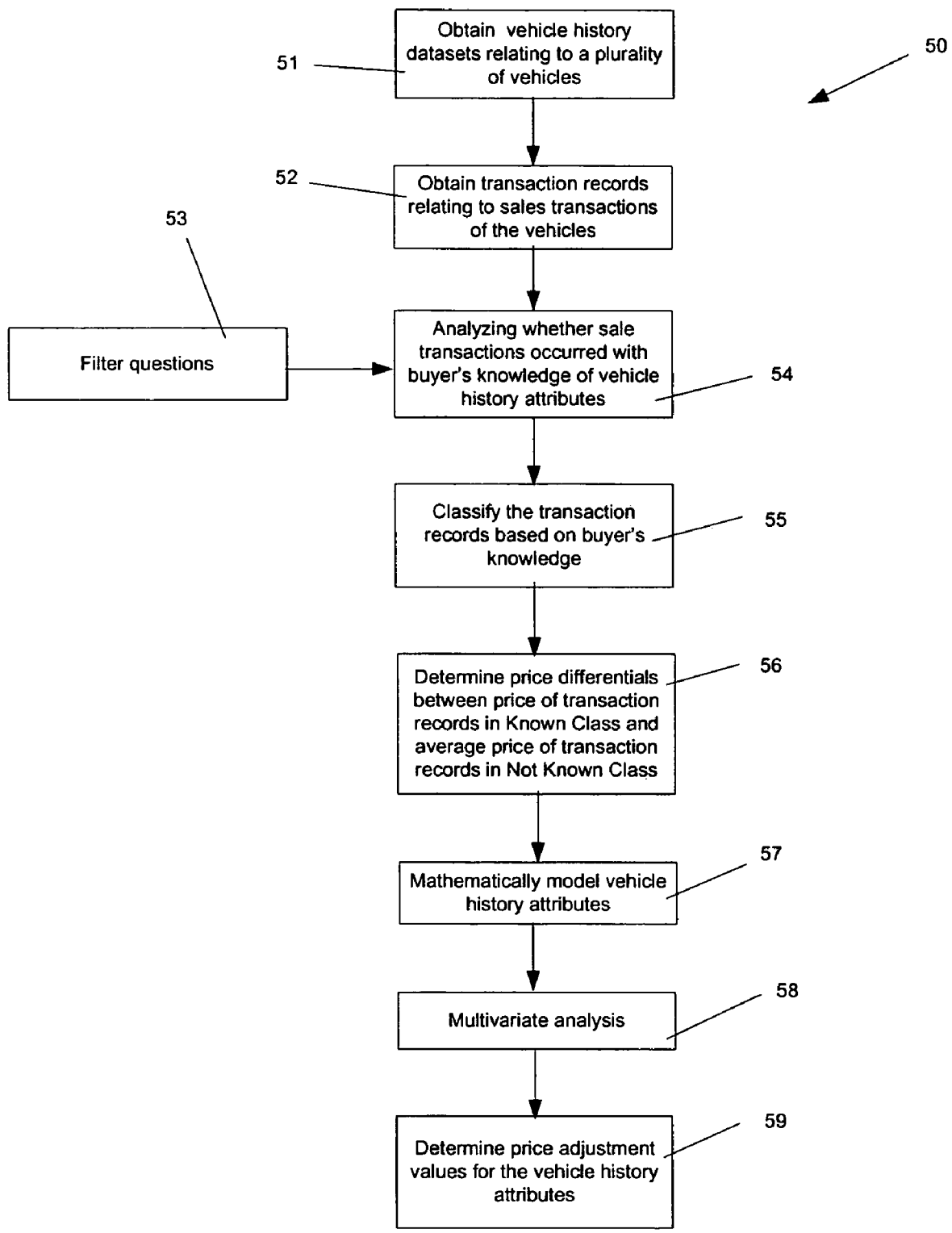
FIG. 5 is a flow diagram illustrating one embodiment of the general method of the present invention.

In view of the above, it should be evident that another aspect of the present invention is a method for generating price adjustment values. In this regard, FIG. 5 shows flow diagram 50 that illustrates the general method for determining price adjustment values associated with the vehicle attributes in accordance with one embodiment. As shown, vehicle history datasets relating to a plurality of vehicles are obtained in step 51, and transaction records relating to sale transactions of the plurality of vehicles are obtained in step 52. Such data may be obtained from the vehicle history database 30 and the transaction database 32 of FIG. 2, for example.

In step 54 of flow diagram 50, a determination is made as to whether each of the sale transactions occurred with buyer's knowledge (actual or inferred) of the vehicle history attributes associated with the vehicle of the transaction record. This step may be attained using filter questions 53 and filter logic discussed previously relative to FIG. 4. The transaction records are then classified in step 55 based on the buyer's knowledge of vehicle history attributes as determined in step 54. For example, the transaction records may be classified into a Known Class in which the buyer possessed knowledge of the vehicle history attributes, Not Known Class in which the buyer did not possess knowledge of the vehicle history attributes, and Uncertain Class in which buyer's knowledge of the vehicle history attributes, or lack thereof, cannot be determined with sufficient certainty.

The price adjustment values for the vehicle history attributes are then determined based on the classification of the transaction records in step 59. In particular, price differentials between the prices associated with transaction records in the Known Class and average price from transaction records in the Not Known Class are calculated in step 56. The vehicle history attributes of each vehicle are then mathematically modeled in step 57 to equal the determined price differential. More specifically, price differentials are set equal to the sum of the products of the vehicle history attributes and price adjustment values, thereby resulting in a plurality of equations. Multivariate analysis is then performed in step 58 to simultaneously solve the plurality of equations to solve for the unknown constants which correspond to the price adjustment values for the vehicle history attributes. Of course, the method as described in flow diagram 50 of FIG. 5 is merely one example method of the present invention and it should be evident to one of ordinary skill in the art that the method may be readily modified or changed.

Figure 6:
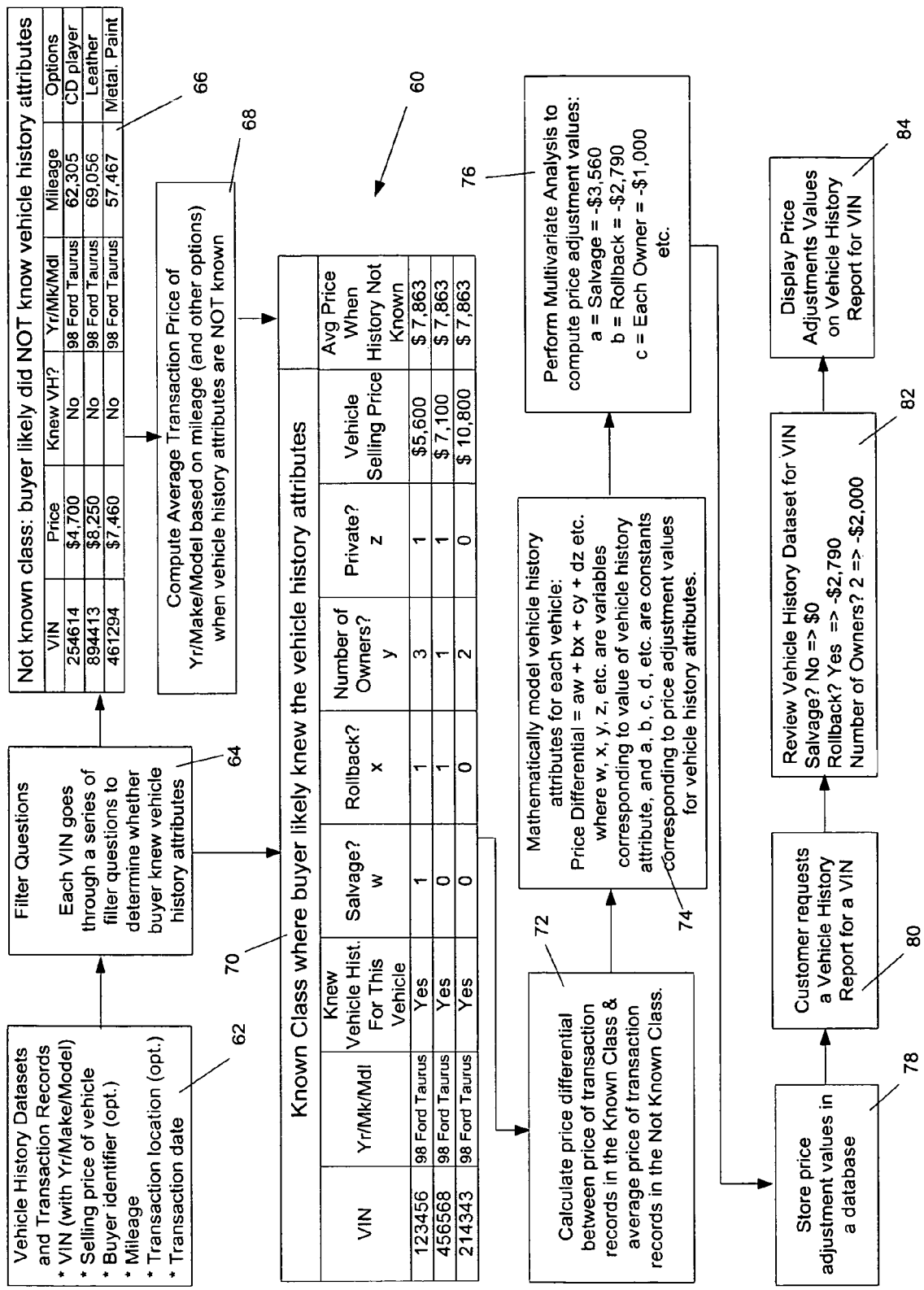
FIG. 6 is a detailed flow diagram illustrating an example method of how the present invention may be used.

For clarity, FIG. 6 illustrates a detailed flow diagram 60 which provides an example of how the present invention in accordance with the method of FIG. 5 discussed above may be used. In particular, in step 62, vehicle history datasets and transaction records are obtained, for example, from vehicle history database 30 and transaction database 32 shown in FIG. 2. Such information preferably includes the VIN, selling price of the vehicle, mileage, transaction date, and optionally, a buyer identifier and transaction location, as well as other information. The vehicle history datasets further include vehicle history attributes regarding a particular vehicle, for example, one or more of the vehicle history attributes listed in TABLE 1 of FIG. 3. In step 64, each sale transaction associated with a transaction record is analyzed to determine buyer's knowledge of one or more of the vehicle history attributes for the particular vehicle being analyzed. This step may be performed in the present implementation by the vehicle history knowledge determination module 36 as discussed previously utilizing the filter questions and logic set forth in FIG. 4.

The transaction records are then classified, for example, by the vehicle history knowledge determination module 36, based on the buyer's knowledge of the vehicle history attributes as determined in step 64. Data matrix 66 shows several examples of transaction records and vehicle history attributes from a portion of vehicle history dataset in the Not Known Class in which the buyer did not know of the vehicle history attributes. Of course, it should be evident that the data matrix 66 only shows information for three vehicles, namely, three 1998 Ford Taurus vehicles, and only several of the vehicle history attributes. In actuality, the data matrix 66 would include expanded data with more than three vehicles to thereby provide a larger data pool.

Average transaction price for the type of vehicle, in this case, Ford Taurus, is computed in step 68 for the transaction records in the Not Known Class. Various other vehicle parameters in addition to make, model and year may be taken into consideration in determining whether a transaction record for a particular vehicle should be used in calculating the average transaction price. For example, mileage may be taken into consideration so that an average transaction price is provided for a particular mileage range of the type of vehicle, for example, 0-25K miles, 26-50K miles, 51-75K miles, etc. Thus, in accordance with the illustrated implementation, the average transaction price is computed for each type of vehicle and the mileage ranges. Of course, additional vehicle parameters to those shown in the data matrix 66 may also be taken into consideration in determining whether a transaction record for a particular vehicle should be used in calculating the average transaction price as well.

The computed average transaction price as determined in step 68 is used as a basis for determining the price adjustment values in conjunction with the transaction records and vehicle history datasets for the same type of vehicle in the Known Class as generally shown in the analysis matrix 70 of FIG. 6. In particular, the same type of vehicles in the Known Class are identified and the vehicle history datasets with the vehicle history attributes associated with the identified vehicles are retrieved, for example, from the vehicle history database 30. Again, other computed transaction price may be used, for example, mean transaction price. In addition, the transaction records regarding the identified vehicles in the Known Class are retrieved from, for example, the transaction database 32, and matched with the vehicle history attributes. It should be noted that in the analysis matrix 70, information for only three vehicles are shown and only several of the vehicle history attributes for these vehicles are shown for simplicity and to facilitate the understanding of this aspect of the present embodiment. However, in actual implementation, more vehicles with corresponding vehicle history datasets and vehicle history attributes would be used for analysis.

In step 72, a price differential between the price associated with each transaction record in the Known Class, and the computed average price from transaction records in the Not Known Class for the same type of vehicle, are calculated. More specifically, the price differentials between the "Vehicle Selling Price" column of the analysis matrix 70 and the "Avg Price When History Not Known" column of the analysis matrix 70 are determined. Of course, the above data matrix 66 and the analysis matrix 70 are illustrated in FIG. 6 to merely facilitate understanding of the present method of calculating the price adjustment values and do not represent a specific data structure or data format required to practice the present invention.

In step 74, the vehicle history attributes for each vehicle are mathematically modeled and set equal to the calculated price differential of step 72. Thus, as shown:

$$\text{Price differential} = aw + bx + cy + dz \ldots \text{etc.}$$

where w, x, y, z, etc. are variables corresponding to values of vehicle history attributes; and where a, b, c, d, etc. are constants corresponding to price adjustment values for the vehicle history attributes.

Step 74 results in a plurality of unsolved equations corresponding to each of the vehicles in the Known Class that are being analyzed. Most of the vehicles are likely to have differing vehicle history attributes and price differentials. Thus, the variables w, x, y, z etc. will likely be different for each of the vehicles.

Some vehicle history attributes are already numeric in nature, for example, the number of owners. Other vehicle history attributes may just be yes/no type of attributes, for example, a lemon title designation in the vehicle history dataset. Such vehicle history attributes may be assigned numeric values so that mathematical modeling and analysis may be performed. For instance, no lemon vehicle designation may be assigned a value "0" while a yes lemon vehicle designation may be assigned a value "1". Again, it should be noted that only several of the vehicle history attributes are modeled in the above example for simplicity in understanding the method of the present invention. However, the present invention is preferably implemented to model a greater number of vehicle history attributes so that price adjustment values for these attributes can be calculated.

As explained above, step 74 results in a plurality of unsolved equations having a plurality of constants multiplied together with the corresponding values for the vehicle history attributes which are summed together to equal the determined price differential for the particular vehicle. The mathematically modeled equations are then simultaneously solved in step 76 to calculated the a, b, c, d, etc. constants which corresponds to the price adjustment values for the vehicle history attributes. This may be attained using any appropriate mathematical techniques. However, in the illustrated implementation of the present invention, multivariate analysis is utilized to calculate the price adjustment values, such methods being known in mathematics.

The price adjustment values calculated in step 76 are stored in a database in step 78, for example, in price adjustment database 28 of FIG. 2. Of course, whereas the price adjustment values are shown as being calculated as a dollar amount in the illustrated example, the price adjustment values may alternatively be calculated as a percentage value, or in other appropriate manner.

In use, when a vehicle history report for a particular vehicle is requested in step 80, for instance, by a customer or user of the vehicle history information system 12 shown in FIG. 2, the vehicle history dataset associated with the particular vehicle is retrieved from the vehicle history database 30. The vehicle history attributes that are associated with the particular vehicle are identified and corresponding price adjustment values for the type of vehicle are retrieved from the price adjustment database 28 in step 82. It should be noted that the price adjustment values for the various vehicle history attributes shown in step 82 are merely examples only and are not actual values calculated using specific vehicle history datasets/transaction records.

The retrieved price adjustment values are then displayed in step 84 to allow the customer or user of the vehicle history information system 12 to adjust the price of the particular vehicle in accordance with the vehicle history attributes. In this regard, the price adjustment values may be displayed to the user in conjunction with a vehicle history report generated by the vehicle history report module 35 which sets forth the vehicle history attributes of the particular vehicle which impacted its value. When another user requests a vehicle history report for another vehicle, the price adjustment values that are applicable to the vehicle history attributes for this vehicle can then be retrieved from the price adjustment database and provided to the user in a similar manner.

Of course, as also explained previously, other implementations of the present invention may include the step of obtaining a base price for the type of vehicle from a third party vehicle pricing services, and actually adjusting this base price using the price adjustment values for the corresponding vehicle history attributes. In addition, as previously noted, whereas the above described embodiment focused on the applicability of the present invention to automobiles, the present invention is also applicable to a variety of transportation devices including motorcycles, boats, airplanes, etc.

It should further be evident to one of ordinary skill in the art that the present invention as described above may be readily implemented as a computer software that is loaded to run, for example, on a computer or other computing device. Thus, another aspect of the present invention is in providing a computer readable medium for generating price adjustments associated with vehicle history attributes. In one embodiment, the computer readable medium may comprise instructions for retrieving a plurality of vehicle history datasets relating to a plurality of vehicles, each dataset having vehicle history attributes regarding a particular vehicle, instructions for retrieving a plurality of transaction records relating to sale transactions of the plurality of vehicles, each transaction record including at least one of date and transaction price, instructions for analyzing whether sale transactions related to the plurality of transaction records occurred with knowledge by buyers of the plurality of vehicles as to vehicle history attributes associated with the plurality of vehicles, instructions for classifying the plurality of transaction records based on buyer's knowledge of the vehicle history attributes, and instructions for determining a price adjustment value for at least one of the vehicle history attributes based on the vehicle history datasets and classification of the plurality of transaction records.

In another embodiment, a computer readable medium for adjusting price of a used vehicle may comprise instructions for obtaining a plurality of vehicle history datasets relating to a plurality of vehicles, each of the datasets having vehicle history attributes regarding a particular vehicle, instructions for obtaining a plurality of transactional records relating to sale transactions of plurality of vehicles, each transaction record including at least one of date and transaction price, and instructions for determining price adjustment values for the vehicle history attributes based on the vehicle history datasets and the transaction records.

In still another embodiment, a computer readable medium for computing price adjustment values associated with vehicle history attributes may comprise instructions for obtaining a plurality of vehicle history datasets relating to a plurality of vehicles, each dataset having vehicle history attributes regarding a particular vehicle, instructions for determining a price differential between a price of a type of vehicle when plurality of vehicle history attributes associated with the type of vehicle are known to a vehicle buyer, and price of the type of vehicle when vehicle history attributes associated with the type of vehicle are not known to a vehicle buyer, and instructions for apportioning the price differential between the vehicle history attributes to generate the price adjustment values.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A computer implemented method for adjusting a base price of a particular used vehicle, the used vehicle having a present status at a specific time, the base price being adjusted based on specific prior events occurring to the used vehicle before the specific time, said method comprising the steps of:

Obtaining, by a vehicle history information computer system, a vehicle history dataset relating to a particular used vehicle, the vehicle history dataset having vehicle history attributes regarding a the particular used vehicle, said vehicle history attributes indicating prior events that have occurred to the particular used vehicle;

Applying, by a vehicle history information computer system, a pricing model module to the vehicle history data set, said pricing model module being based on obtaining at least one transaction record relating to terms of sale of used vehicles said transaction records including a transaction price of a used vehicle that is the subject of the transaction record and vehicle history attributes indicating prior events that have occurred to the used vehicle that is the subject of the transaction record; and Calculating, by a vehicle history information computer system, a single quantifiable price adjustment value for said particular used vehicle based on a plurality of said vehicle history attributes and said transaction records in the pricing model for vehicles similar to the particular used vehicle.

2. The method of claim 1, further including the step of displaying said price adjustment value for said particular vehicle.

3. The method of claim 1, further including the step of obtaining a base price for said particular vehicle from a used vehicle valuation service.

4. The method of claim 3, further including the step of adjusting said base price for said particular vehicle based on said calculated price adjustment value.

5. The method of claim 4, further including the step of displaying said adjusted base price for said particular vehicle.

6. The method of claim 1, further including the step of retrievably storing said price adjustment value in a price adjustment database.

7. The method of claim 1, wherein the pricing model is based only on transaction records for which it has been determined with reasonable certainty that a buyer had knowledge of relevant vehicle history attributes at the time of the corresponding sales transactions of said transaction records.

8. The method of claim 1, wherein said calculating step comprises performing multivariate analysis to compute price adjustment values for said vehicle history attributes in said transaction records.

9. A computer system for adjusting a base price of a particular used vehicle, the used vehicle having a present status at a specific time, the base price being adjusted based on specific prior events occurring to the used vehicle before the specific time, said system comprising:

a memory device to store instructions;
at least one processor coupled with the memory device to execute instructions to implement, a receiving module for receiving vehicle history dataset relating to a particular used vehicle, the vehicle history dataset having vehicle history attributes regarding the particular used vehicle, said vehicle history attributes indicating prior events that have occurred to the particular used vehicle;

a price adjustment module including a pricing model, said pricing model being based on at least one transaction record relating to sale terms of used vehicles, said transaction records including a transaction price of a used vehicle that is the subject of the transaction record and vehicle history attributes indicating prior events that have occurred to the used vehicle that is the subject of the transaction record, said price adjustment module being configured to calculate a single quantifiable price adjustment value for said particular vehicle based on said vehicle history attributes and said pricing model.

10. The system of claim 9, further including a price adjustment database for retrievably storing said price adjustment values.

11. The system of claim 9, wherein the pricing model is based only on transaction records for which it has been determined with reasonable certainty that a buyer had knowledge of the relevant vehicle history attributes at the time of the corresponding sales transacts of said transaction records.

12. The system of claim 9, wherein said price adjustment module is further adapted to perform multivariate analysis to compute price adjustment values for said vehicle history attributes in said plurality of transaction records.

13. The system of claim 9, wherein said system further includes a display module adapted to display said price adjustment values for said used vehicle.

14. The system of claim 9, wherein said system is adapted to obtain a base price for said used vehicle from a used vehicle valuation service.

15. The system of claim 14, wherein said price adjustment module is further adapted to adjust said base price for each vehicle history attribute associated with said used vehicle using said price adjustment values that correspond to said vehicle history attributes associated with said used vehicle.

16. The system of claim 15, wherein said system further includes a display module adapted to display said adjusted base price for said vehicle.

17. A computer implemented method for creating a pricing model to be used for adjusting a base price of a particular used vehicle, the used vehicle having a present status at a specific time, the base price being adjusted based on specific prior events occurring to the used vehicle before the specific time, said method comprising the steps of:

obtaining, by a vehicle history information computer system, transaction price data relating to sale transactions of used vehicles;

obtaining, by a vehicle history information computer system, vehicle history attributes indicating prior events that have occurred to the used vehicles;

creating by a vehicle history information computer system, transaction records, each transaction record including a transaction price of a used vehicle that is the subject of the transaction record and vehicle history attributes indicating prior events that occurred to the used vehicle that is the subject of the transaction record; and storing by a vehicle history information computer system, the transaction records in a database in accordance with a unique identifier of the vehicle that is the subject of the transaction record.

18. The method of claim 17, further comprising the step of determining with reasonable certainty which of the transaction records represent a transaction in which a buyer had knowledge of relevant vehicle history attributes at the time of the corresponding sales transactions; and wherein said storing step comprises storing only the transaction records which have been determined, in said determining step, to represent a transaction in which a buyer had knowledge of relevant vehicle history attributes at the time of the corresponding sales transactions.

19. The method of claim 18, wherein said determining step comprises classifying said transaction records into classes comprising a Known Class in which each sale transaction occurred with buyer's knowledge of said vehicle history attributes, and a Not Known Class in which each sale transaction occurred without buyers' knowledge of said vehicle history attributes.

20. The method of claim 19, wherein determining step further comprises classifying said transaction records into an Uncertain Class in which buyer's knowledge of said vehicle history attributes is indeterminate.

21. The method of claim 20, wherein said price adjustment values for said vehicle history attributes are calculated based on said transaction records that are in said Known Class, and said Not Known Class.

22. The method of claim 21, further including the step of determining an average transaction price for a type of vehicle in said transaction records classified in said Not Known Class that have the same vehicle parameters, said vehicle parameters including at least identical make, model and year.

23. The method of claim 21, further including the step of identifying at least one transaction record for said type of vehicle in said transaction records classified in said Known Class that have the same vehicle parameters.

24. The method of claim 23, further including the step of calculating a price differential between transaction price associated with said at least one transaction record in said Known Class, and said determined average transaction price for said type of vehicle in said transaction records classified in said Not Known Class.

25. The method of claim 24, wherein said step of calculating price adjustment values for said vehicle history attributes includes attributing said price differential to said vehicle history attributes in said at least one transaction record in said Known Class.

26. The method of claim 25, wherein said at least one transaction record in said Known Class is a plurality of transaction records in said Known Class, and said method further includes the step of determining price differentials between each of said plurality of transaction records in said Known Class and said determined average transaction price.

27. The method of claim 26, further including the step of performing multivariate analysis to compute price adjustment values for said vehicle history attributes in said plurality of transaction records.

28. The method of claim 27, wherein said plurality of transaction records in said Known Class from which price differentials are determined are transaction records for the same type of vehicle having the same vehicle parameters as said transaction records classified in said Not Known Class from which said average transaction price is determined.

29. The method of claim 26, wherein said transaction records classified in said Not Known Class correspond to transactions within a predetermined time.

30. The method of claim 29, wherein said predetermined time is not greater than one year from a time of said at least one transaction record in said Known Class.

31. A computer readable media having computer readable instructions recorded thereon that implement a method when executed by a computer processor, said method being a method for adjusting a base price of a particular used vehicle, the used vehicle having a present status at a specific time, the base price being adjusted based on specific prior events occurring to the used vehicle before the specific time, said method comprising the steps of:

obtaining a vehicle history dataset relating to a particular used vehicle, the vehicle history dataset having vehicle history attributes regarding the particular used vehicle, said vehicle history attributes indicating prior events that have occurred to the particular used vehicle;

applying a pricing model module to the vehicle history data set, said pricing model module being based on at least one transaction record relating to sale terms of used vehicles, said transaction records including a transaction price of a used vehicle that is the subject of the transaction record and vehicle history attributes indicating prior events that have occurred to the used vehicle that is the subject of the transaction record; and calculating a single quantifiable price adjustment value for said particular used vehicle based on a plurality of said vehicle history attributes and said transaction records in the pricing model for vehicles similar to the particular used vehicle.

32. The media of claim 31, wherein the method further comprises the step of displaying said price adjustment value for said particular vehicle.

33. The media of claim 31, wherein the method further comprises the step of obtaining a base price for said particular vehicle from a used vehicle valuation service.

34. The media of claim 33, wherein the method further comprises the step of adjusting said base price for said particular vehicle based on said calculated price adjustment value.

35. The media of claim 34, wherein the method further comprises the step of displaying said adjusted base price for said particular vehicle.

36. The media of claim 31, wherein the method further comprises the step of retrievably storing said price adjustment value in a price adjustment database.

37. The media of claim 31, wherein the pricing model is based only on transaction records for which it has been determined with reasonable certainty that a buyer had knowledge of relevant vehicle history attributes at the time of the corresponding sales transactions of said transaction records.

38. The media of claim 31 wherein said calculating step comprises performing multivariate analysis to compute price adjustment values for said vehicle history attributes in said transaction records.

\* \* \* \* \*

UNITED STATES PATENT AND TRADEMARK OFFICE
CERTIFICATE OF CORRECTION

PATENT NO.       : 7,596,512 B1
APPLICATION NO.  : 10/721780
DATED            : September 29, 2009
INVENTOR(S)      : Raines et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this

Twenty-eighth Day of September, 2010

David J. Kappos
*Director of the United States Patent and Trademark Office*